Nov. 2, 1954   R. D. ERICKSON   2,693,400
ADJUSTABLE SERVING TRAY FOR AUTOMOBILES
Filed Nov. 28, 1952   2 Sheets-Sheet 1

INVENTOR
Richard D. Erickson
BY Robrton Dunning
ATTORNEY

Nov. 2, 1954  R. D. ERICKSON  2,693,400
ADJUSTABLE SERVING TRAY FOR AUTOMOBILES
Filed Nov. 28, 1952  2 Sheets-Sheet 2

INVENTOR
Richard D. Erickson
BY Robert M. Dunning
ATTORNEY

United States Patent Office 2,693,400
Patented Nov. 2, 1954

2,693,400

ADJUSTABLE SERVING TRAY FOR AUTOMOBILES

Richard D. Erickson, St. Paul, Minn.

Application November 28, 1952, Serial No. 323,006

2 Claims. (Cl. 311—21)

This invention relates to an improvement in automobile serving tray and deals particularly with a detachable tray which may be supported on the back of the front seat of an automobile.

In recent years numerous drive-in restaurants have been constructed which specialize in serving meals or refreshments out of doors to occupants of automobiles. Various types of trays have been devised for use in conjunction with these restaurants, most of the trays being constructed to attach to the door of the vehicle. In certain types of automobiles, it is inconvenient to use such trays for the passengers of the rear seat. Furthermore, in the event there are three passengers in the back seat, the passenger in the center can not well use a door attached tray.

A feature of the present invention resides in the provision of a simple and inexpensive tray which can be produced at low cost and which may be suspended from the rear of the front seat particularly for use by passengers in the rear seat of the vehicle.

A feature of the present invention resides in the provision of a tray which will fold into a compact space when it is not in use.

A further feature of the present invention resides in the provision of a tray which may be maintained in a horizontal position regardless of the shape or contour of the rear surface of the front seat.

Another feature of the present invention resides in the provision of a tray embodying a pair of supporting hooks and a brace designed to extend along the rear surface of the front seat, all of which are secured on a common pivot or on aligned pivots.

These and other objects and novel features of the present invention will be more clearly and fully set forth in the following specification and claims.

In the drawings forming a part of the specification:

Figure 1:
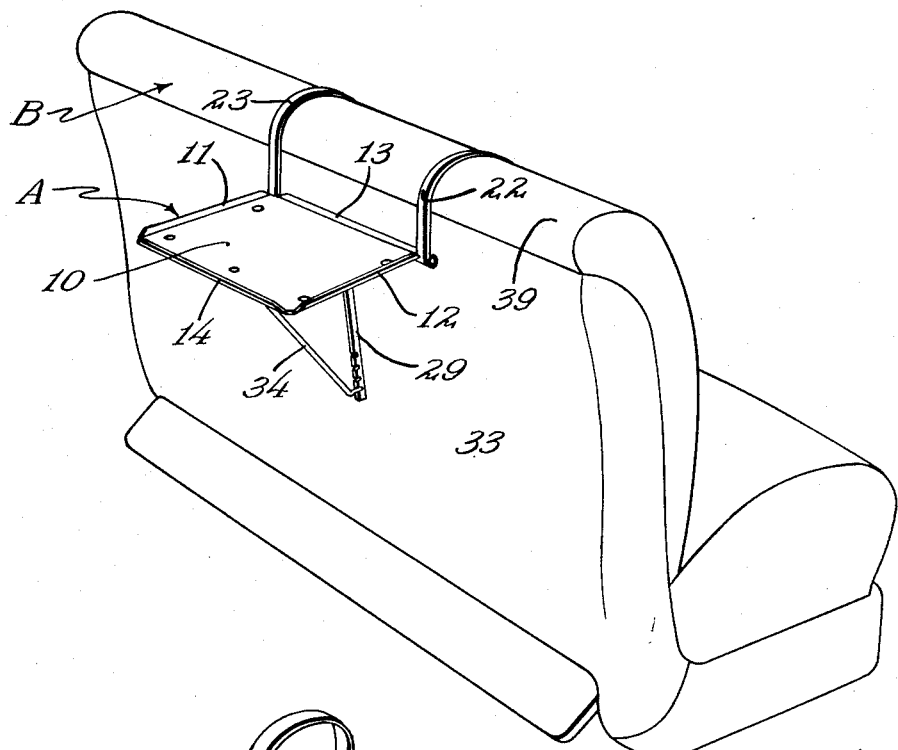
Figure 1 is a perspective view of a vehicle seat showing the manner in which the tray may be supported thereupon.
Figure 2:
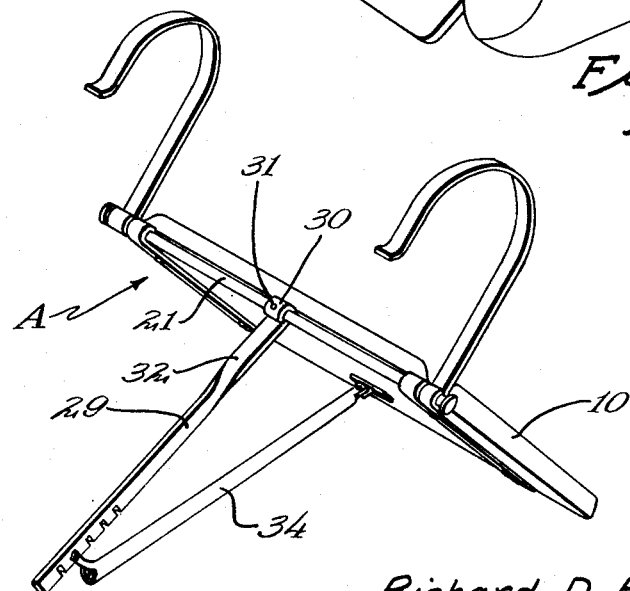
Figure 2 is a bottom perspective view of the tray in readiness for attachment to the vehicle seat.
Figure 3:
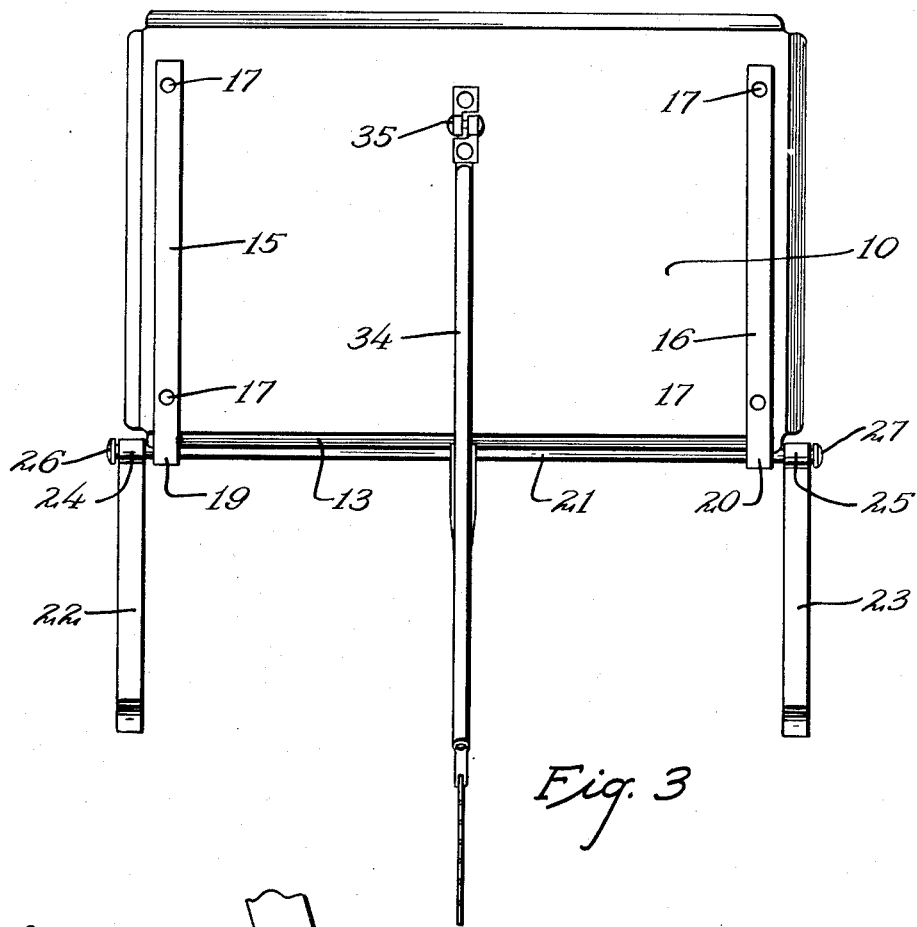
Figure 3 is a bottom plan view of the tray.
Figure 4:
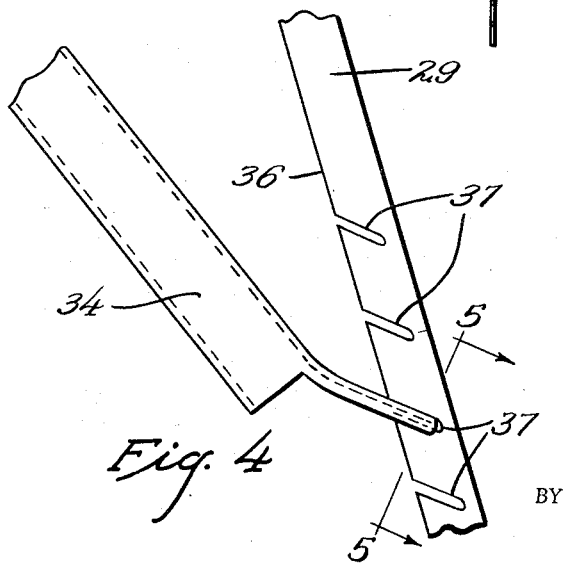
Figure 4 is an elevation view of a detail portion of the structure.

The tray is indicated in general by the letter A and is designed for attachment to a seat such as B. The type of seat on which the tray is best used is the front seat of an automobile and the tray is normally secured to overlie the rear surface thereof.

The tray A includes a tray body 10 of any suitable outline shape. In the particular form of construction illustrated the tray is generally rectangular in form and is provided with upwardly inclined marginal flanges. Side wall flanges 11 and 12 are provided at the ends of the tray body and front and rear flanges 13 and 14 are provided along the front and rear edges. The flanges may be connected to form a continuous wall or may be spaced if desired.

A pair of reinforcing straps 15 and 16 are secured to the undersurface of the tray body 10 by rivets 17, by spot welding or by any other suitable means. These straps 15 and 16 extend forwardly of the forward edge 13 of the tray and are bent into generally cylindrical form to provide bearings 19 and 20. The bearings 19 and 20 are designed to encircle a pivot rod 21 which extends parallel with the forward edge of the tray and is designed to pivotally support various elements of the structure.

A pair of hooks 22 and 23 are provided with cylindrically bent ends 24 and 25 of proper size to encircle the shaft or rod 21. The rod 21 is provided with enlarged ends 26 and 27 which extend outwardly of the hook bearings 24 and 25 and limit the longitudinal sliding of the hooks upon the rod 21. In the particular form of construction illustrated the hooks 22 and 23 may slide a short distance laterally on the rod 21 to permit proper adjustment of the hooks upon the seat, but this distance is definitely limited.

A brace arm 29 is supported upon the rod 21 intermediate the ends thereof. This brace 29 comprises an elongated strap of metal or plastic bent to provide a bearing 30 at one end thereof. This bearing 30 fits snugly about the rod 21 and in preferred form is secured thereto in any way such as by the pin 31. The rod is twisted intermediate its ends as indicated at 32 to provide a narrow edge against the rear surface 33 of the seat B and to present its opposite edge directed rearwardly.

Figure 5:
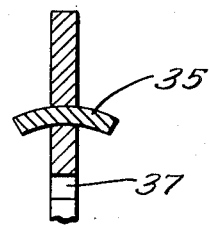
Figure 5 is a sectional view through a portion of the device, the position of the section being indicated by the line 5—5 of Figure 4.

A second brace 34 is hingedly connected at one end by a hinge 35 to the undersurface of the tray body 10 near the rear edge thereof and centrally between the ends of the tray. In the form illustrated the brace arm 34 is of tubular structure and includes a projecting tongue 35 of inverted trough shape form. The cross sectional shape of the projecting tongue 35 is best illustrated in Figure 5 of the drawings.

The rearwardly facing edge 36 of the brace 29 is provided with a series of angularly directed parallel slots or notches 37. These notches 37 are of proper size to accommodate the tongue 35 at the end of the brace arm 34. The weight of the tray body and the brace arm 34 hold the tongue 35 engaged in a selected notch 37. The channel shape of the tongue 35 prevents the tongue from disengaging the selected notch in a lateral direction. Thus the tray is firmly supported and will support a considerable weight even though the structure is lightly built and is light in weight.

The operation of the apparatus will be easily understood from the foregoing description. When it is desired to attach the tray the hooks 22 and 23 are placed over the upper edge 39 of the seat B so that the shaft or rod 21 extends transversely along the rear surface 33 of the seat. When thus attached the brace arms 29 and 34 may be detached and these elements as well as the tray body 10 will depend from the rod 21.

The tray body 10 may then be swung upwardly into horizontal position and by engaging the brace arm 29 in one hand and the brace arm 34 in the other hand, these two elements can be engaged, the arm 29 being held firmly against the rear of the front seat during this operation so that the tongue 35 may be engaged in the proper notch 37 to hold the tray body in horizontal position. When the tray is no longer to be used, the tray can be folded in the obvious manner so as to be compact in form.

In accordance with the patent statutes, I have described the principles of construction and operation of my serving tray, and while I have endeavored to set forth the best embodiment thereof, I desire to have it understood that this is only illustrative thereof and that obvious changes may be made within the scope of the following claims without departing from the spirit of my invention.

I claim:

1. A serving tray for automobiles including a tray body, hook means secured to said tray body along aligned pivots disposed adjacent one edge of the tray body, a brace arm secured to said tray body on a pivot line aligned with said first named pivots, a second brace arm having one end pivotally engaging the underside of said tray body near the opposite edge thereof, said first arm being provided with a series of longitudinally spaced slots extending from the edge thereof nearest said second arm toward its opposite edge for receiving the other end of said second arm to retain said tray body in a selectively adjusted position.

2. A serving tray in accordance with claim 1 in which said other end of the second arm is arcuate so as to resist lateral deflection of said arm and inadvertent disengagement thereof from any of the slots.

References Cited in the file of this patent

UNITED STATES PATENTS

| Number | Name | Date |
|---|---|---|
| 1,232,874 | Whealen | July 10, 1917 |
| 1,571,753 | Christian | Feb. 2, 1926 |
| 1,692,685 | Newman | Nov. 20, 1928 |
| 2,015,976 | Trepte et al. | Oct. 1, 1935 |
| 2,173,569 | Troendle | Sept. 19, 1939 |
| 2,474,943 | Hedger | July 5, 1949 |
| 2,556,724 | Hubsch | June 12, 1951 |